April 17, 1951 P. E. BESSIERÈ ET AL 2,549,362
HEATING DEVICE OF THE HOT-AIR TYPE
Filed Feb. 19, 1949
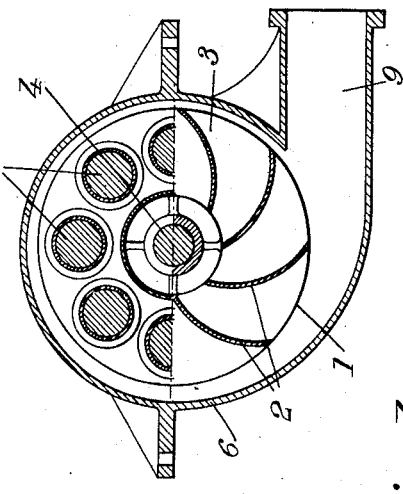
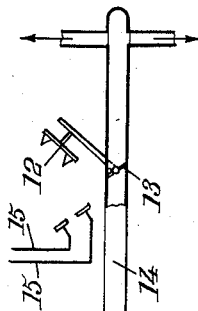
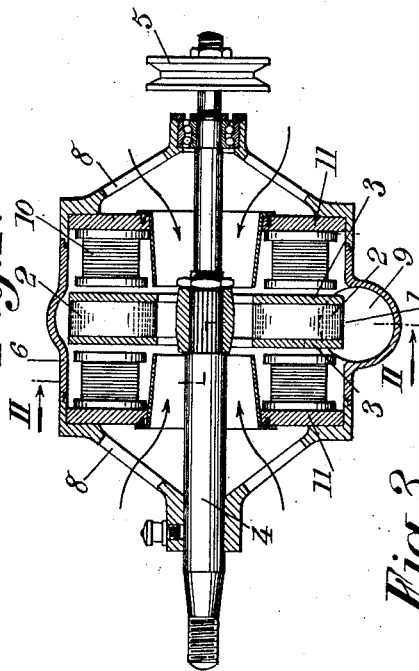
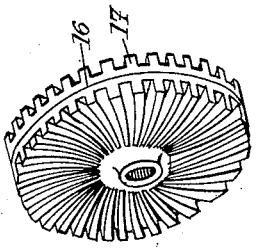
INVENTORS
PIERRE ETIENNE BESSIERÈ
LOUIS EMILE PONSY
BY *Mock & Blum*
ATTORNEYS

UNITED STATES PATENT OFFICE 2,549,362

HEATING DEVICE OF THE HOT-AIR TYPE

Pierre Etienne Bessiere, Paris, and Louis Emile Ponsy, Clichy, France, assignors to Society "Silto," S. A., Paris, France, a society of France Application February 19, 1949, Serial No. 77,345
In France November 27, 1948

4 Claims. (Cl. 219—42)

1

The present invention relates to heating devices of the hot air type and it is more particularly but not exclusively concerned with devices of this kind intended to be mounted on vehicles.

The chief object of our invention is to provide a device of this kind which is better adapted to meet the requirements of practice than those existing at the present time.

Preferred embodiments of the present invention will be hereinafter described with reference to the accompanying drawings, given merely by way of example and in which:

Fig. 1 shows, in diagrammatic axial section, a heater made according to our invention;

Fig. 2 is a sectional view on the line II—II of Fig. 1;

Fig. 3 shows a modification of the rotor of this device;

Fig. 4 diagrammatically shows a heating device according to our invention, together with its control means.

A heater according to our invention includes a rotary fan (such as a centrifugal fan or an axial fan) which draws air from the outside, for instance from the atmosphere and delivers this air to the inside of a vehicle to be heated.

When the fan is a centrifugal one, as this is the case for the devices shown by the drawing, this fan includes a rotor 1 provided with blades 2 disposed, for instance between two discs 3 and fixed on a shaft 4 driven either, advantageously, by the motor of the vehicle (which motor generally is an internal combustion engine but might also be a steam engine or any other engine) or by a suitable shaft of a trailer vehicle. In order to ensure this drive, for instance through a belt, we fix a pulley 5 on shaft 4. The shaft and the rotor are housed inside a casing 6 provided, for instance on either side of the rotor, with inlet apertures 8 for the air that is sucked in and with a discharge tangential outlet pipe, this pipe communicating with the inside of the compartment or space to be heated, through a suitable conduit.

In order to have the air heated as it passes through the above mentioned fan, we create, according to our invention, Foucault currents in the fan rotor. For this purpose, this rotor is made, at least partly, of a magnetic metal, in particular soft iron, and this rotor is caused to rotate in the magnetic field of at least one electro-magnet which may be energized from a suitable source of current. For instance we may make use of current supplied by the battery of the vehicle on which the fan is mounted, since

2 only little power is necessary for energizing electro-magnets.

At least the discs 3 of rotor 1 are made of a magnetic metal, or, better, the whole of the rotor is made of such a metal. Furthermore, we provide, on either side of the rotor, electro-magnets 10, the magnetic fluxes being closed either through each of discs 3, from one electro-magnet to the next one on the same side of the rotor, or across said discs, in a direction parallel to the axis 4 of the rotor, in which case blades 2 must be made of a magnetic metal, or again through both of these paths.

Anyway, when the electro-magnets are energized, Foucault currents occur inside the rotor, due to the rotation thereof with respect to the electro-magnets and these currents produce an intensive heating of the rotor, which is cooled down by the air sucked in and delivered by said rotor, whereby this air is thus heated.

By varying the intensity of the electro-magnet energizing current, for instance by means of a rheostat, the heating effect can be adjusted.

By cutting off the energizing of the electro-magnets, the fan can be used during summer time to ensure a cooling air circulation in the vehicle.

Of course, when the electro-magnets are energized and the rotor is consequently heated by the effect of the Foucault currents, sufficient amounts of air must flow through the fan, in order to avoid a dangerous rise of the temperature in the rotor. For this reason, it may be advantageous to connect the switch 12 provided for opening or closing the electro-magnet energizing current circuit, with shutter 13, which is mounted in the conduit 14 which connects the fan outlet pipe 9 with the inside of the vehicle. The connection between switch 12 and shutter 13 is arranged in such manner that shutter 13 is necessarily opened when switch 12 closes the electro-magnet energizing circuit 15 (see Fig. 4).

The fan shown by Figs. 1 and 2 is provided with a rotor of the usual shape. However, it may be advantageous to give this rotor a special shape especially adapted to its double function of fan element and heating element. Such a special shape is shown by Fig. 3 according to which the rotor is constituted by a disc 16 provided on either side thereof with blade-shaped ribs 17 which may be integral with disc 16. This rotor, which is made of a magnetic metal, is particularly adapted to ensure the passage of the magnetic flux therethrough in a direction parallel to the axis of the rotor.

It should be noted that a heating device made according to the invention has many advantages which consist, among others: in the possibility of fitting this device on any existing car; in the small volume it occupies; in the facility of its adjustment; and in its low cost of manufacture.

Of course the heated air, instead of being directly introduced into the space to be heated, may pass through a heat interchanger located in this space. Also, the heating device according to our invention may serve to heat a stationary room, especially when there exists in this room or close thereto a motor capable of driving the fan.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A heater which comprises, in combination, a rotary fan for feeding air to a space to be heated, at least a portion of the rotor of said fan being made of a magnetic metal, and means for producing a magnetic field across the path of movement of said rotor, whereby Foucault currents are produced in said rotor when it is rotating.

2. A heater according to claim 1 in which said rotor includes two discs parallel to each other and perpendicular to the rotor axis and blades interposed between said discs, at least said discs being made of a magnetic metal.

3. A heater according to claim 1 in which said rotor is constituted by a disc of a magnetic metal provided with blade-shaped ribs on either side thereof.

4. A heating device which comprises, in combination, a heater including a rotary fan for feeding air to a space to be heated, at least a portion of the rotor of said fan being made of a magnetic metal, and an electro-magnet for producing a magnetic field across the path of movement of said rotor, whereby Foucault currents are produced in said rotor when it is rotating, an output conduit for the air delivered by said fan, an electric circuit for energizing said electromagnet, a shutter for closing or opening said conduit, and a switch for controlling said circuit operatively connected with said shutter so as to open said conduit when said switch is closed.

PIERRE ETIENNE BESSIERÈ.
LOUIS EMILE PONSY.

REFERENCES CITED

The following references are of record in the file of this patent:

UNITED STATES PATENTS

| Number | Name | Date |
|---|---|---|
| 1,335,423 | Bonnaval | Mar. 30, 1920 |
| 2,088,604 | Littlefield | Aug. 3, 1937 |